United States Patent [19]
Blessing

[11] 3,987,941
[45] Oct. 26, 1976

[54] PRESERVING CONTAINER FOR LIQUID FOOD SUBSTANCES

[76] Inventor: Alfred V. Blessing, 2919 Lake St., Curran, Mich. 48728

[22] Filed: Aug. 29, 1975

[21] Appl. No.: 608,963

Related U.S. Application Data

[63] Continuation-in-part of Ser. No. 424,676, Dec. 14, 1973, abandoned.

[52] U.S. Cl. .................................. 222/386; 220/93
[51] Int. Cl.² ......................................... B65D 25/10
[58] Field of Search .......... 222/386, 386.5; 220/93, 220/221, 222

[56] References Cited
UNITED STATES PATENTS

| | | | |
|---|---|---|---|
| 100,029 | 2/1870 | Hamilton et al. | 222/386 X |
| 598,676 | 2/1898 | Lochmann | 222/386 X |
| 1,978,025 | 10/1934 | McCown | 222/386.5 X |
| 3,804,635 | 4/1974 | Weber | 222/386 X |

FOREIGN PATENTS OR APPLICATIONS

| | | | |
|---|---|---|---|
| 281,228 | 4/1928 | United Kingdom | 222/386 |
| 109,655 | 9/1916 | United Kingdom | 222/386 |

*Primary Examiner*—Allen N. Knowles
*Assistant Examiner*—Hadd Lane
*Attorney, Agent, or Firm*—Harry R. Dumont

[57] ABSTRACT

A container for cooked liquid food substances in which there is provided a follower lid or upper cover capable of following the level of the liquid as the food substance is removed from the container. The invention includes a particular construction of lid and seal that allows for free upward and downward movement of the lid in contact with the liquid as the liquid level changes. In this manner, the liquid is not in contact with air which would cause its contamination and loss of flavor.

9 Claims, 7 Drawing Figures

U.S. Patent Oct. 26, 1976 Sheet 1 of 2 3,987,941
FIG. 1
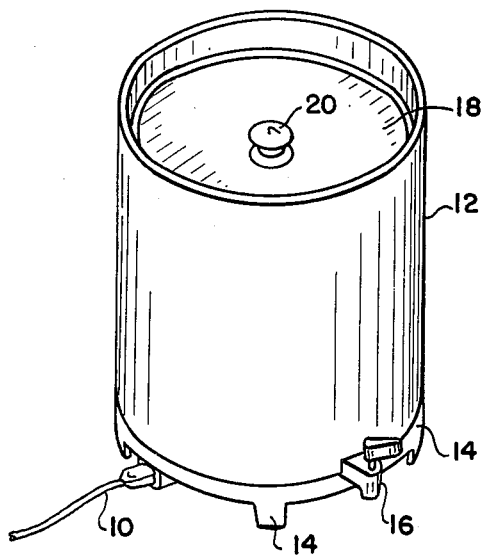
FIG. 2
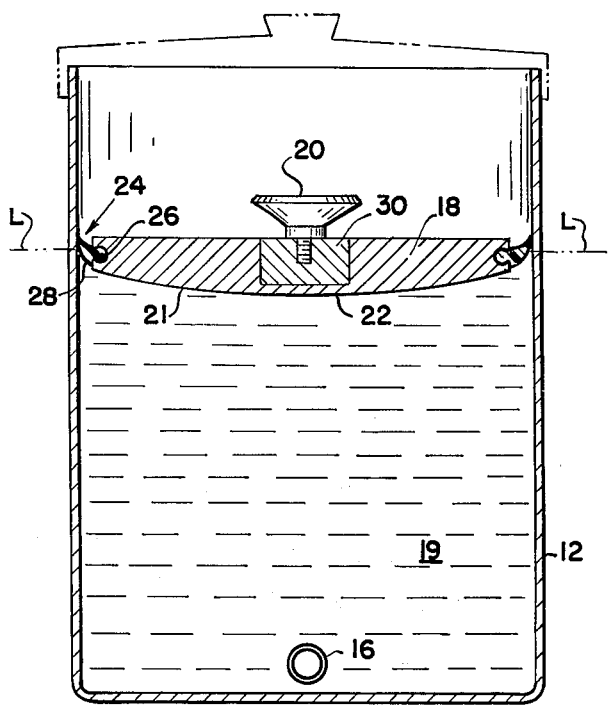
FIG. 3
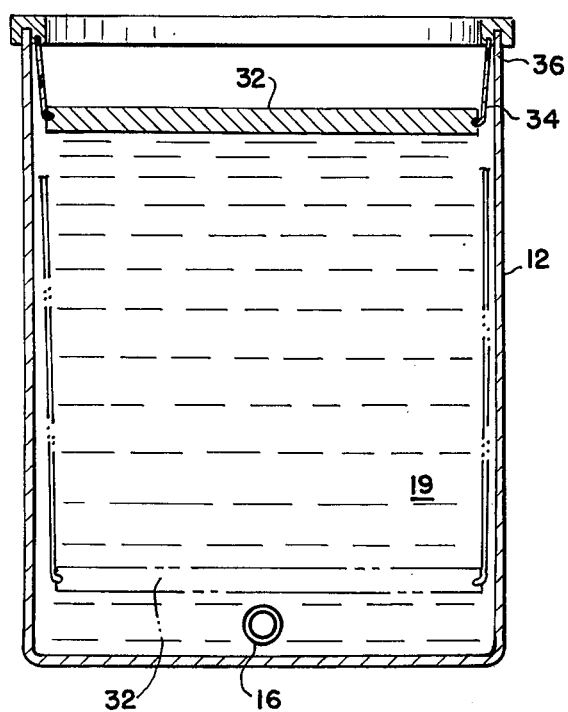
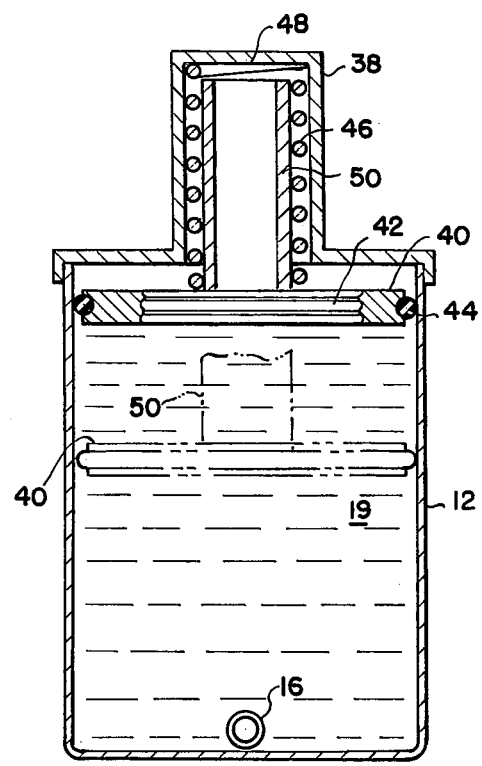
FIG. 4

PRESERVING CONTAINER FOR LIQUID FOOD SUBSTANCES

REFERENCE TO RELATED APPLICATION

This application is a continuation-in-part of my copending application Ser. No. 424,676 filed on Dec. 14, 1973 for "Preserving Container for Liquid Food Substances", now abandoned.

BACKGROUND OF THE INVENTION

Various arrangements have been contrived to provide an upper seal for vessels containing food substances to inhibit the circulation of air at their upper surface as the items or substances are removed from the container. One example of such a seal is shown in U.S. Pat. No. 551,540 issued on Dec. 17, 1895 for "Liquid Dispensing Apparatus." That patent shows a float containing and emitting a sealing liquid used to shut off the air from liquid in a vessel. The sealing liquid at elevated temperatures, such as would be experienced with heated and reheated liquids, would be inoperable and indeed would contaminate the liquid itself. The liquid container float shown in that patent provides a substantially different and inferior sealing system from that of the present invention.

Other arrangements have been known to the prior art in which there is a preserving container in which fruit or solid other food particles are submerged within a vessel and in which the food particles are futher contained in a liquid to further the preservation of the food particles. This problem encountered and solved with respect to the prior art of this type is that there is used a follower cover to preserve food products through a pressure plate. The follower cover, when weighted down, keeps the food particles under the upper surface level of the liquid. The problem encountered and solved by prior art devices similar to this is not that of "keeping air from a liquid food substance" but rather of "keeping the solid food substance particles under the upper level of a liquid" and, in line with this approach, the floating lid ordinarily does have an escapement opening which permits liquid to pass through the lid and to remain in all cases in contact with the ambient atmosphere contained between the outer and the inner lids used in the combination. This type of prior art device is shown and described in U.S. Pat. No. 1,948,353 issued on Feb. 20, 1934 to J. L. Lagorio for "Preserving Container."

None of the prior art devices or systems is effective after the manner of the present invention to provide a properly controlled movement of a lid device so that the upper level of the liquid food is continuously followed during heating and reheating and during subsequent depletion from the container in such manner as to completely eliminate its contamination by contact with the air enclosed in the container or with ambient air so that bacterial contamination and loss of flavor of the liquid substance is completely inhibited. It will be understood that any liquid food substance is subject to contamination because of the bacterial or chemical reactions contained in the air regardless of the temperature at which the air or the liquid is maintained.

The present invention is directed toward the specific embodiment of a container for coffee in which, for example, the coffee is initially cooked and from which it is later served in successive individual portions over a period of hours or even days. It will be further understood that the present invention is equally applicable to thermos-type containers in which coffee has already been precooked in another container and is then stored in such manner as to retain its heated condition.

SUMMARY OF THE INVENTION

The present invention will thus be seen to relate to the provision of a container for liquid food substances, such as coffee, in which they have initially been heated or subsequently been stored in a heated condition so that the flavor of the food substance is substantially preserved. In keeping with this objective, the present invention incorporates a system whereby there is substantially inhibited any possibility of air contamination through bacteria or other chemical reactions contained in the air and in communication with the upper level of the liquid.

It is an objective of the present invention to provide a container and an arrangement of parts, including a vertically movable follower lid and seal, in the container which will permit not only preservation of a liquid food substance in it, but also make possible the reheating of the food substance and its further preservation in the heated state in the container without flavor loss or contamination over a relatively long period of time. The seal is of a particular and specialized configuration which allows free upward and downward movement of the lid on the layer of liquid.

DESCRIPTION OF THE DRAWINGS

The present invention, its objects, features and advantages, will become apparent upon reading the following detailed description in conjunction with the accompanying drawings, wherein like reference characters refer to like parts throughout the several views, and in which:

FIG. 1 is a perspective view of one embodiment of the present invention;

FIG. 2 is a cross-sectional view of the apparatus of FIG. 1 showing the detail of one embodiment of the present invention;

FIG. 3 is a cross-sectional view of a food container showing an alternate embodiment of the present invention;

FIG. 4 is a cross-sectional view of a food container showing a still further embodiment of the present invention in which a different means is employed for providing a downward biasing force to the lid to insure its closely following the upper level of the liquid as the liquid is removed from the container;

DETAILED DESCRIPTION OF THE INVENTION

Figure 5:
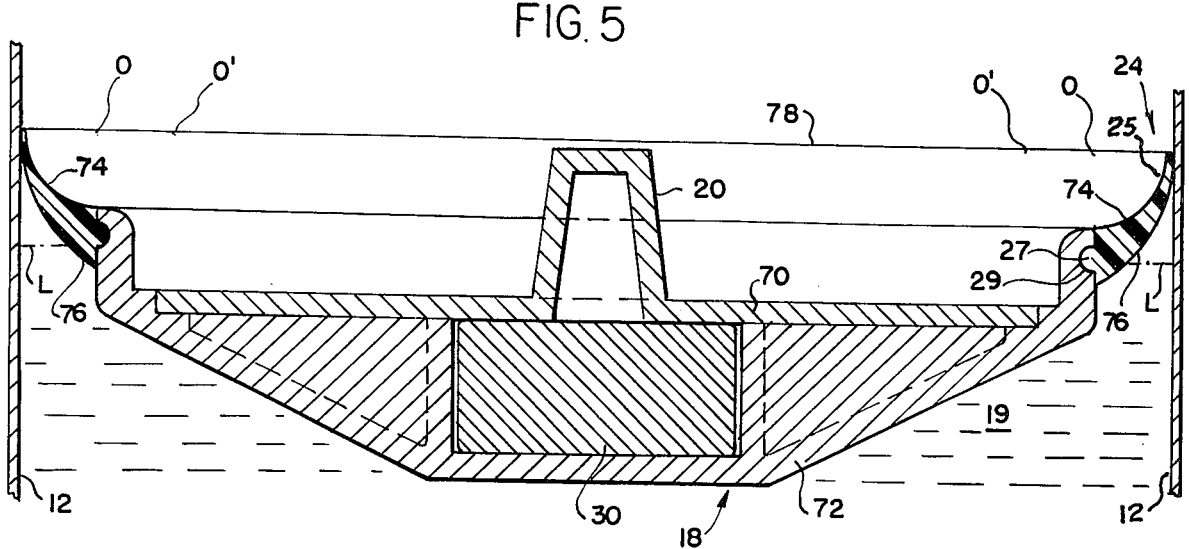
FIG. 5 is a cross-sectional view of a preferred embodiment of my invention.

FIG. 1 shows one form of the present invention in which the liquid that is desired to be preserved in it in a heated condition is coffee. The container is in the form of a coffee urn which through an electrical conductor 10 is coupled to a suitable electrical source for heating the coffee initially. The container is a cylindrical container 12 of a conventional type which is supported on a plurality of legs 14. Included at the lower end of the container 12 is a spigot or like outlet 16 for selectively withdrawing fluid from the container 12. At the upper end of the container 12, there is included a vertically movable follower lid 18 which may be embodied as an element separate and apart from the normal lid use on a coffee heating urn.

In FIG. 1 the apparatus is shown after the initial heating has occurred, with the conventional lid removed from the urn 12 and the vertically movable lid 18 inserted in position to provide the following action which is characteristic of the present invention. It will be understood that the normal upper cap or lid may be left in place during subsequent withdrawal of the fluid 19 from the urn 12, or it may actually be removed when the vertically movable lid 18 is inserted to provide the preservation action which is important in the performance and utilization of the present invention. For conveience, the follower lid 18 is provided with a central heat insulated cap or knob 20 so that the removal of the lid 18 may be performed at any time without regard to the heated condition of the coffee in the urn.

It has been found that if the present invention is incorporated in a standard coffee urn or coffee pot, it is possible at any time to reheat the coffee without any loss of the flavor or of the bouquet such as the coffee lover is accustomed to enjoy.

FIG. 2 is a half-sectional view which illustrates the detail of the container 12 and of the follower lid 18 which is particularly designed to protect the upper surface of the liquid 19 from any contamination by ambient air or by the air chamber that might otherwise be left in communication with the upper level of the liquid 19 as the supply of the liquid is depleted by use and by withdrawal through the outlet 16. To this end, the lid 18 is provided with a lower surface of a convex curvature which is identified by the numeral 22. This particular configuration of the lower surface assists in preventing the entrapment of air in communication with the upper surface of the liquid 19. Further, to prevent the contamination of the liquid 19 by contact with air, there is provided a peripheral seal 24 about the lid 18. The seal 24 includes an inner lip 26 and an outer deflectible tapered portion 28 which remains at all times spread in contact with the upper surface of the wall of the container 12. It will be apparent that the container 12, while it is illustrated as being a circular cross-sectional configuration, may also be embodied as any parallel sided vessel.

As further shown in FIG. 2, the lid 18 has a centrally located weight 30 that is selected to provide and control the location of the center of gravity of the lid 18 which is as low as possible and located at the centerpoint of the lid to eliminate any possible tilting as the lid moves downwardly within the container 12. The peripheral seal 24 should preferably be of a soft deflectible material with a low coefficient of friction and of a size slightly larger in diameter than the container 12 so as to maintain intimate contact with inner surface of the sides of the container 12 as the lid 18 is being lowered in operation. The lid further has its weight adjusted by the preselection of weight 30 so that the friction of the peripheral seal 24 will be overcome and the lid 18 itself will move downwardly each time a quantity of liquid 19 is removed from the container 12. The total weight of the lid 18, as it is finally provided through weight 30, is not sufficient to overcome its buoyancy so that it will float at the top of the upper layer of the liquid 19. The upper level of the liquid 19 is shown by a dot-dash line L, thus illustrating how the lower surface of the seal 24 is in wetting engagement with the liquid. This relationship between liquid, seal and lid assures that only an exceedingly small amount of air remains in place between the lower surface of the lid 18 and the liquid 19. It will further be understood that all materials used in the construction of this device, that is, of the seal, lid and other associated parts, are of a non-toxic nature and will contain no material that will discolor or impart detrimental flavor to the liquid contained, whether it be coffee, soup, or any other liquid food substance.

FIG. 3 shows an alternate embodiment of the present invention with a container 12, which may likewise be a coffee urn, having a lower spigot outlet 16 from which the coffee is removed. The system includes an upper follower lid 32 which is substantially similar in function to the lid 18 of FIG. 2 in that it follows the downward course of the liquid 19 as it is being removed from the container 12. In this case the seal against air contact is provided not through a peripheral seal such as peripheral seal 24, but through a deflectible diaphragm 34 which has its lower edge connected about the outside of the follower lid 32. At its upper end margin, the diaphragm 34 is clamped within the edges of a separate clamp ring 36 about the upper end of the container 12. Again the weight of the follower lid 32 is sufficient to cause it to follow the upper surface of the liquid 19 and to eliminate any open air chamber being formed between the top of the liquid and the ambient air. The upper position of the follower lid 32 is indicated in solid line, while the lowered or intermediate position of the lid is shown in phantom line.

FIG. 4 illustrates an alternate embodiment of the present invention as it may be used with a different type of food container, for example, a thermos bottle, in which the preheated liquid 19 has been transferred to an insulating or heat preserving vessel or container 12. In this case, an upper lid 38 is shown clamped in a closed position about the upper end of the container 12. The thermos in this case contains a lower spigot 16 from which the liquid 19 may be withdrawn as it is used. The lid 40 is somewhat differently embodied, in this case as a hollow cylindrical member with an air chamber 42 centrally contained and an O-ring 44 arranged between the outer periphery of the lid 40 and the inner surface of the container 12. The lid 40 has connected to it a means for forcing it to follow the upper surface of the liquid 19 as it is being withdrawn from the container 12. It will be understood that the means for providing the downward biasing force may be embodied as a variety of elements, such as, for example, a compression type spring 46 which is shown in the FIG. 4 drawing or, alternately, a hydraulic, pneumatic or like compression system in which a relatively constant downward force is opposed against the upper surface of the lid 40.

With more particular reference to the device of FIG. 4, the compression spring 46 is retained at its upper end against the inner surface 48 of the lid 38, while the lower end of the compression spring 46 is in driving abutment with the upper surface of the lid 40. To provide the necessary telescoping movement of the assembly, there is further included a cylindrical sleeve 50 that is fixed to the upper surface of the lid 40 and about which the spring 46 is journaled for its operative movement. Again, the several parts of the lid assembly are shown in solid line configuration, such as when the vessel is relatively full of liquid 19, and in phantom line position when the compression spring 46 is almost fully extended and the amount of liquid 19 is depleted toward its lowest level.

FIG. 5 shows a preferred embodiment of the present invention in which the lid 18 is shown to enlarged scale to make clear the construction of the associated parts, particularly construction of the seal 24. The lid 18 will be seen to include an upper cover 70 which has upstanding from it a central knob 20. The entire lid 18 may be formed from a molded plastic material. In a like manner to the FIG. 2 embodiment, there is included a central metallic weight 30. The lower or bottom portion 72 of the lid 18 is of a downwardly projecting frustrated cone shape to allow for the passage of air upwardly toward the edges of the seal 24 from which, when the liquid is in a heated condition, the entrapped air will be allowed to escape. A number of radially extending ribs (not shown) may be included to provide for the bracing of the entire construction of the lid 18. The level of the liquid 19 is shown by a dot-dash line L, which is shown at both sides of the FIG. 5 drawing. The specific gravity of the entire lid 18 is such as to allow for the level shown for the liquid 19 and it will be seen that a very small amount of air is allowed to remain in communication with the liquid 19.

Now more detailed attention will be given to the construction of the seal 24. The seal 24 will be seen to be of a generally tapered shape, with a tapered outer skirt pportion 25. The tapered portion 25 further includes, viewed in cross section, an arcuate inner curved surface 74 and an arcuate outer curved surface 76. The inner arcuate surface 74 is generated about a center 0, while the outer arcuate surface 76 is generated about a center 0', as shown. It will be seen that both the centers 0 and 0' lie on a line 78 connecting the upper edge portions of the seal 24. This relationship between the curvatures of the two surfaces of the seal 24 is critical in the operation of the seal and allows for a loose, sliding motion and extremely low frictional engagement between the upper outer edges of the seal 24 and the abutting opposed sides of the container 12. It further enables the escape of entrained gas from the liquid 19 upon heating. As the liquid 19 is withdrawn from the lower end of the container, the lid 18 rides down maintaining the relationship between the outer curved portion 76 of the seal 24 and the liquid level L. As the liquid 19 is reheated, any pressures created would be exerted against the lower surface 76 of the seal, thereby caausing the seal to bend inwardly toward the center. This bending is caused by the differences in area between the upper surface 74 and the lower surface 76. Thus, there is permitted free movement of the lid 18 in the upward direction. The seal 24 further includes a bead portion 27 formed at its inner margin, which is gripped or cemented to a mating annular notch 29 formed in the rim of the lower part 72 of the lid 18.

Figure 6:
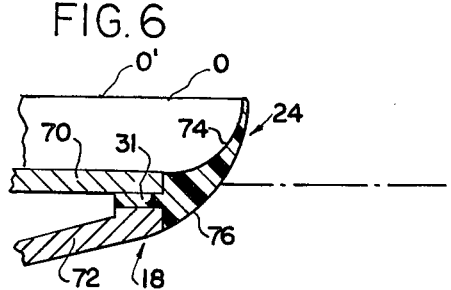
FIG. 6 is a fragmentary cross-sectional view of an alternate construction for the seal of FIG. 5.

FIG. 6 shows an alternate embodiment and different means for attaching the seal 24 to the lower portion 72 of the lid 18. For attachment purposes, there is a projecting rim 31 extending inwardly and adapted to be gripped between the upper cover 70 and the lower portion 72 at a plurality of places around the periphery of the seal 24. In a similar manner to the embodiment of FIG. 5, the arcuate curved portion 74 has as its center of rotation the center 0, while the outer arcuate portion 76 has its center of rotation at center 0'. Thus, the radius of the circle generating the arcuate portion 76 is substantially larger than that of the arcuate portion 74.

Figure 7:
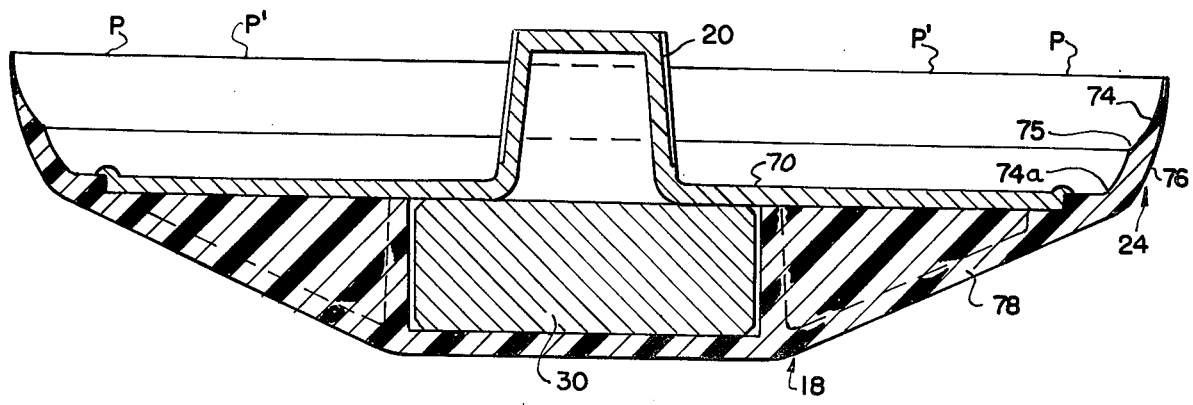
FIG. 7 is a cross-sectional view showing a still further embodiment of my invention.

FIG. 7 shows a still further embodiment of the invention in which the upper part of the lid 18 includes a cover 70 and upstanding knob 20. The seal in this case is incorporated as part of an integrally formed shroud 78 which may be molded from a single piece of plastic such as polypropylene. In the embodiment of FIG. 7, it will be seen that the inner surface of the seal 24 includes two curved portions 74 and 74a, while the outer surface, similarly to the embodiment of FIG. 5, includes an arcuate surface 76. The center of rotation for the arcuate surface 74 is at point P, while the center of rotation for the outer arcuate surface 76 is at P'. The resultant shape of the seal 24 is like that shown in FIG. 5, except that there is now provided a somewhat enlarged portion or rib 75 between the arcuate inner curved portions 74 and 74a. This provides some bracing for the central part of the seal 24, but likewise allows for the free bending of the upper tip of the seal 24, for example, along the inner surface of the container 12 as already shown in FIG. 5. The outer shroud 78 may be press-fitted and cemented in place around the periphery of the upper lid part 70. The lower surface of the lid 18 is preferably likewise downwardly convex to admit for passage of air upwardly along the lower periphery of the lid 18 and for its escape to avoid entrapment above the liquid 19. This embodiment of FIG. 7 has some considerable advantages with respect to its simplicity and economy of manufacture as compared to the other types of lids heretofore shown in the drawings.

It will thus be shown that by the present invention it is possible to preserve a food-liquid for an indefinite period of time without detrimental effect on the flavor of the liquid. The invention is applicable to be incorporated as a part of the apparatus in which the liquid is initially cooked or it is equally usable in conjunction with a vessel, such as one of the thermos insulating type, in which a preheated liquid is to be kept hot for a relatively long period of time.

What is claimed is:
1. A container for the preparation and preservation of a heated liquid, comprising:
   a cylindrical type container in which the liquid is heated;
   means for removing portions of the liquid from the container as it is being used;
   a follower lid operable to remain at the upper layer of the liquid as it is being removed from the container, said lid having a weight mounted in it proximate its central portion for maintaining it partially submerged relative to the upper layer of said liquid; and
   a deflectible seal mounted around the periphery of the lid, said seal having a tapered outer skirt portion with its free end extending upwardly and positioned between the periphery of the lid and the inner surface of the container, said tapered portion, further viewed in cross section, having a first arcuately shaped inner curved portion, said first curved portion having a center of rotation positioned on a line connecting the terminal edges of said tapered portion, and a second arcuately shaped outer curved portion of said tapered portion, said second curved portion being substantially radially larger than the first and further having its center of rotation likewise mounted on said line.
2. The combination as set forth in claim 1 wherein said deflectible seal further includes an inner bead portion, said bead portion held in gripped holding relationship in an opposed mating portion formed in the periphery of said lid.

3. The combination as set forth in claim 1 wherein said lid is formed from united upper and lower parts and said deflectible seal further includes an inner extension, said extension held in gripped relationship between the upper and lower parts of said follower lid.

4. The combination as set forth in claim 1 wherein the radial distance between said inner curved portion and its center of rotation is approximately one-half the radial distance between said outer curved portion and its respective center of rotation.

5. The combination as set forth in claim 1 wherein the submerged surface of said lid in contact with the liquid is of a downwardly extending convex shape to prevent air entrapment beneath the lid.

6. The combination as set forth in claim 1 wherein the weight to volume ratio of said lid is of a magnitude to maintain the upper surface level of the liquid intermediate the upper and lower ends of said lower curved portion of said seal tapered portion.

7. A container for the preparation and preservation of a heated liquid, comprising:
 a cylindrical type container in which the liquid is heated;
 means for removing portions of the liquid from the container as it is being used;
 a follower lid operable to remain in contact with the upper layer of the liquid as it is being removed from the container, said lid having a weight mounted in it proximate its central portion for maintaining it partially and continuously submerged relative to the upper layer of the liquid as the liquid is removed and its level is lowered in the container; and
 a shroud mounted about the lower surface of the lid, said shroud terminating in a freely deflectible seal, said seal having a tapered outer skirt portion including a free edge extending upwardly between the periphery of said lid and the opposed inner surface of said container, said tapered portion, viewed in cross section, having inner and outer arcuate surfaces each formed about its respective center, each center mounted on a line connecting the (terminal) free edge(s) of said seal, said inner arcuate surface having a radius substantially less than the radius of said outer arcuate surface.

8. The combination as set forth in claim 7 wherein there is provided a substantially central enlarged rib in said tapered portion intermediate the lid periphery and the (terminal) free edge of said seal.

9. A container for the preparation and preservation of a heated liquid, comprising:
 a cylindrical type container in which the liquid is heated;
 an outlet for removing portions of the liquid from the lower end of the container as it is used;
 a weighted follower lid operable to remain at the upper layer of the liquid as it is being removed from the container; and
 a deflectible seal mounted about the edge of the lid, said seal having a tapered outer portion including an upwardly extending free edge and positioned between the edge of the lid and the inner surface of the container, said tapered portion having an upper surface of a generally arcuate shape and a lower surface of a like shape, the area of the upper surface being substantially smaller than that of the lower surface of the tapered portion, the spacing between the lid edge and container inner surface having a size effective to deflect the tapered portion upwardly to maintain said lower surface in close sealing relationship with the container inner surface.

* * * * *